(12) United States Patent
Okada

(10) Patent No.: US 7,494,156 B2
(45) Date of Patent: Feb. 24, 2009

(54) QUICK CONNECTOR

(75) Inventor: Hiroyuki Okada, Koga (JP)

(73) Assignee: Sanoh Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 11/596,564

(22) PCT Filed: May 17, 2005

(86) PCT No.: PCT/JP2005/008966

§ 371 (c)(1),
(2), (4) Date: Nov. 15, 2006

(87) PCT Pub. No.: WO2005/116509

PCT Pub. Date: Dec. 8, 2005

(65) Prior Publication Data

US 2008/0136163 A1    Jun. 12, 2008

(30) Foreign Application Priority Data

May 25, 2004    (JP)    ............................... 2004-154462

(51) Int. Cl.
*F16L 39/00*    (2006.01)
(52) U.S. Cl. ........................................ 285/93; 285/319
(58) Field of Classification Search .................. 285/93, 285/319
See application file for complete search history.

(56) References Cited

U.S. PATENT DOCUMENTS

| | | | | |
|---|---|---|---|---|
| 4,946,205 A * | 8/1990 | Washizu | ...................... | 285/319 |
| 5,178,424 A * | 1/1993 | Klinger | ........................ | 285/319 |
| 5,441,313 A * | 8/1995 | Kalahasthy | ................... | 285/93 |
| 5,542,712 A * | 8/1996 | Klinger et al. | ................ | 285/93 |
| 5,863,077 A * | 1/1999 | Szabo et al. | ................... | 285/93 |
| 5,893,590 A * | 4/1999 | Klinger et al. | .............. | 285/319 |
| 6,145,886 A * | 11/2000 | Ohta et al. | ..................... | 285/93 |

(Continued)

FOREIGN PATENT DOCUMENTS

JP    11-006591    1/1999

(Continued)

OTHER PUBLICATIONS

Patent Abstracts of Japan of JP 2004-044790 dated Feb. 12, 2004.

(Continued)

*Primary Examiner*—David E Bochna
(74) *Attorney, Agent, or Firm*—Ladas and Parry LLP

(57) ABSTRACT

An easily usable quick connector includes a connector body 12, a retainer 16, and a complete connection indicating member 28 capable of being repeatedly used for indicating if a tube 14 has been inserted in the connector body 12 with an end part thereof provided with an annular ridge 15 locked in place by the retainer 16 at a position for complete connection. The complete connection indicating member 28 is combined with the connector body 12 so as to be movable into the connector body 12. The complete connection indicating member 28 can be completely pressed into the connector body 12 only when the end part of the tube 14 is inserted in the connector body 12 so that the locking tongues 24a and 24b of the retainer 16 are engaged completely with the annular ridge 15 of the tube 14.

8 Claims, 4 Drawing Sheets

U.S. PATENT DOCUMENTS

| | | | |
|---|---|---|---|
| 7,044,505 B2 * | 5/2006 | Takayanagi | 285/93 |
| 7,128,347 B2 * | 10/2006 | Kerin | 285/93 |
| 7,328,922 B2 * | 2/2008 | Takayanagi et al. | 285/93 |

FOREIGN PATENT DOCUMENTS

| JP | 2004-003635 | 1/2004 |
|---|---|---|
| JP | 2004-044790 | 2/2004 |

OTHER PUBLICATIONS

Patent Abstracts of Japan of JP 2004-003635 dated Jan. 8, 2004.
Patent Abstracts of Japan of JP 11-006591 dated Jan. 12, 1999.

* cited by examiner

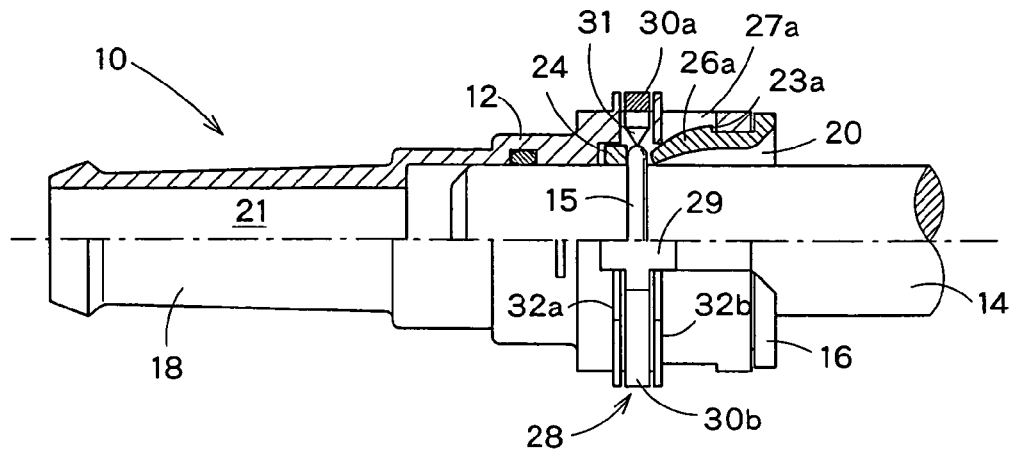
F I G. 5
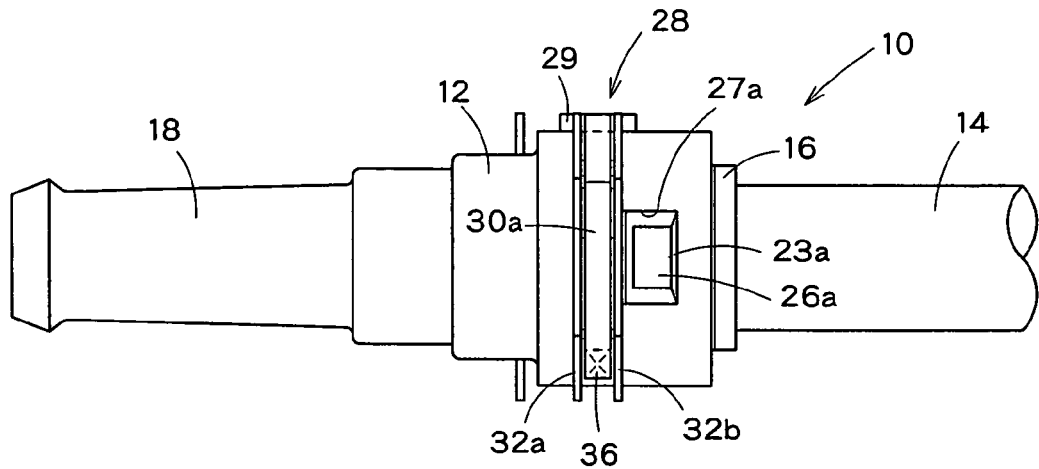
F I G. 6
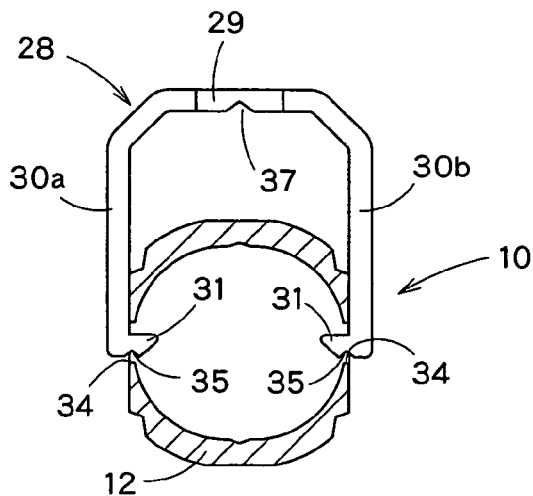
F I G. 7

QUICK CONNECTOR

TECHNICAL FIELD

The present invention relates to a quick connector for connecting tubes of piping systems including an automotive fuel system.

BACKGROUND ART

Quick connectors are used widely, for example, for connecting fuel tubes of automotive fuel systems. The quick connector is capable of simply and quickly connecting tubes without using any fastening means, such as bolts. The quick connector has a connector body to be attached to one of two tubes, and a retainer to be pressed in the connector body after inserting the other tube in the connector body to retain the tube in the coupling body. Representative quick connectors are disclosed in Patent documents 1 and 2.

As shown in FIG. 8, one of two tubes to be connected by a quick connector of this type, namely, a tube 2 in FIG. 8, is provided with an annular ridge in its end part. A sliding retainer 5 is pressed radially into a connector body 4 through an opening formed in the connector body 4 so that and end 6a of a rib 6 formed in the retainer 5 engages the annular ridge 3 to restrain the tube 2 from separating from the connector body 4.

A correct connecting procedure for connecting the tube 2 to the connector body 4 includes sequential steps of inserting the tube 2 in the connector body 4 and pressing the retainer 5 into the connector body 4. However, it often occurs that the retainer 5 is pressed into the connector body 4 before the tube 2 is inserted in the connector body 4 as shown in FIG. 9. If the tube 2 is inserted in the connector body 4 after pressing the retainer 5 into the connector body 4, the annular ridge 3 comes into contact with the end 6a of the rib 6 of the retainer 5 and the tube 2 cannot be further inserted in the connector body 4. Consequently, the tube 2 is connected incompletely to the connector body 4. It is difficult to discriminate a condition where the quick connector and the tube 2 are incompletely connected from a condition where the quick connector and the tube 2 are completely connected from appearance. A conventional quick connector is designed such that the tip of the tube 2 is unable to reach O rings 7 and a fluid leaks in a leakage test if the tube 2 and the quick connector are incompletely connected to indicate the incomplete connection of the tube 2 and the quick connector.

A quick connector disclosed in Patent document 3 is designed to enable the recognition of incomplete connection of the quick connector and a tube 2 at a glance. This quick connector includes a complete connection indicating member in addition to a retainer. The complete connection indicating member cannot be easily removed from the quick connector unless the tube 2 is inserted correctly in the quick connector and the retainer is engaged correctly with the tube.

Patent document 1: U.S. Pat. No. 5,542,716
Patent document 2: JP 2002-206683 A
Patent document 3: JP 11-230456 A

DISCLOSURE OF THE INVENTION

The complete connection indicating member of the quick connector disclosed in Patent document 3 can be removed from the quick connector after the tube has been inserted in the quick connector to a position for complete connection, and the complete connection indicating member breaks if the complete connection indicating member is pulled in a state where the tube and the quick connector are connected incompletely. Therefore, if the tube and the quick connector are incompletely connected and the complete connection indicating member is broken when the same is pulled to see if the tube and the quick connector are completely connected, the complete connection indicating member cannot be used again. Since the complete connection indicating member is to be pulled out of the quick connector, it is difficult to inspect the condition of connection of the tube and the quick connector under a condition where the joint of the tube and the quick connector is in a narrow space.

Accordingly, it is an object of the present invention to solve the problems in the prior art and to provide a quick connector including a connector body, a retainer, and a complete connection indicating member capable of being repeatedly used for indicating if a tube has been inserted in the connector body with an end part thereof locked in place by the retainer at a position for complete connection, and capable of being easily operated.

The present invention provides a quick connector including: a connector body in which an end part, provided with an annular ridge, of a tube is inserted; a retainer provided with locking tongues to be engaged with the annular ridge to lock the end part of the tube in place in the connector body; and a complete connection indicating member for indicating a condition where the end part of the tube has been completely inserted in the connector body such that the retainer is able to engage completely with the annular ridge; wherein the complete connection indicating member is inserted in the connector body to a temporary position to combine the complete connection indicating member temporarily with the connector body so that the complete connection indicating member can be only pressed into the connector body in a radial direction, and the complete connection indicating member can be pressed into the connector body from the temporary position to a complete connection indicating position only when the end part of the tube is inserted in the connector body to a position where the locking tongues of the retainer can completely engage with the annular ridge.

The present invention provides a complete connection indicating member, to be used in combination with a quick connector including a connector body in which an end part, provided with an annular ridge, of a tube is inserted and a retainer provided with locking tongues to be engaged with the annular ridge to lock the end part of the tube in place in the connector body, to indicate a condition where the end part of the tube has been completely inserted in the connector body such that the retainer is able to engage completely with the annular ridge, formed in a U-shaped member having a pair of legs respectively having hooked end parts facing each other and capable of engaging in openings formed in the side walls of the connector body, wherein the hooked end parts are shaped such that the hooked end parts can disengaged from the openings so that the complete connection indicating member can be pressed into the connector body and are kept engaged in the openings so that the complete connection indicating member cannot be pulled out of the connector body when the end part of the tube is inserted in the connector body with the annular ridge positioned so as to be able to be engaged with the locking tongues of the retainer and the hooked parts are half pushed out of the openings by the annular ridge.

According to the present invention, the complete connection indicating member can indicate the complete connection of the tube and the quick connector by its condition of being able to be pressed into the connector body and can be repeatedly used for indicating whether or not the end part of the tube has been completely inserted in the connector body and has been completely locked in place by the retainer. The complete connection indicating member can be easily operated because the complete connection indicating member needs simply to be pressed.

BRIEF DESCRIPTION OF THE DRAWINGS

FIG. 5 is a half longitudinal sectional view of the quick connector shown in FIG. 1 in a state of complete connection;

FIG. 6 is a side elevation of the quick connector shown in FIG. 1 in a state of complete connection;

FIG. 7 is a cross-sectional view of a quick connector combined with a complete connection indicating member in a modification;

BEST MODE FOR CARRYING OUT THE INVENTION

Figure 1:
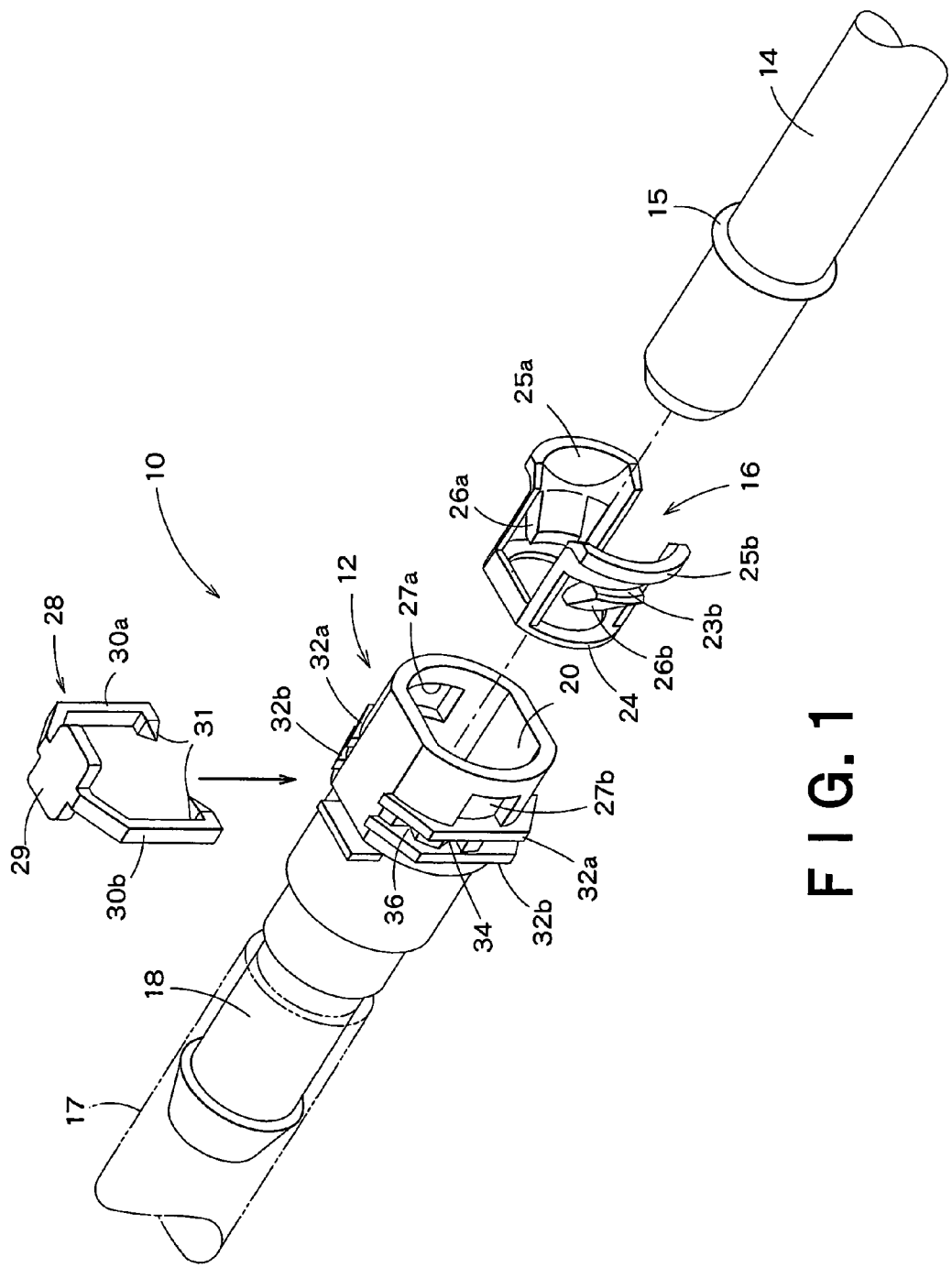
FIG. 1 is an exploded perspective view of a quick connector in a preferred embodiment according to the present invention.
Figure 2:
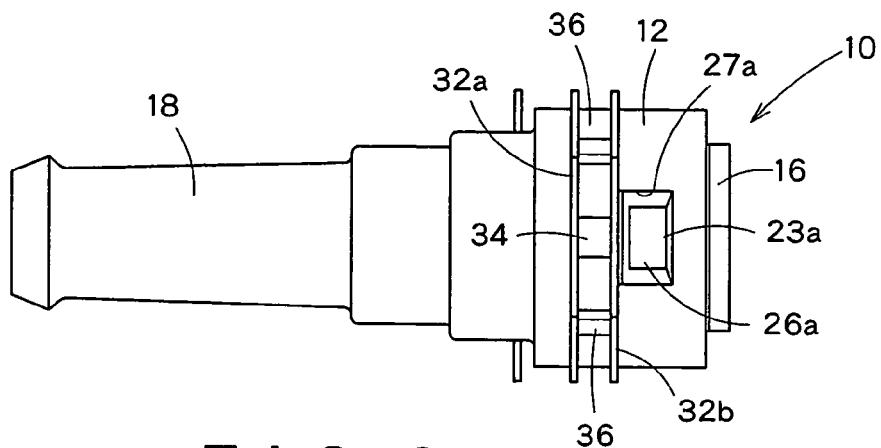
FIG. 2 is a side elevation of the quick connector shown in FIG. 1.

A quick connector in a preferred embodiment according to the present invention will be described with reference to the accompanying drawings. FIG. 1 is an exploded perspective view of a quick connector in a preferred embodiment according to the present invention and FIG. 2 is a side elevation of a connector body included in the quick connector shown in FIG. 1. Shown in FIGS. 1 and 2 are a quick connector 10 including a connector body 12, a retainer 16 and a complete connection indicating member 28, and a tube 14 to be connected to the quick connector 10. The tube 14 has an end part provided with an annular ridge 15 at a predetermined distance from the end of the end part. Basically, the tube 14 can be completely connected to the quick connector 10 with the tube 14 retained in the connector body 12 by the retainer 16 simply by pressing the end part of the tube 14 into the assembly of the connector body 12 and the retainer 16.

The connector body 12 of the quick connector 10 has a female connecting part having an opening 20 through which the tube 14 is inserted in the connector body 12, and a male connecting part 18 to be pressed into a resin tube 17. In some cases, a rubber tube is used instead of the resin tube 17. The connector body 12 is provided with a stepped, axial through hole 21 as shown in FIG. 5.

The retainer 16 is a substantially cylindrical member formed of a plastic material and having an annular part 24 having an inside diameter approximately equal to the outside diameter of the tube 14, and flexible side frames 25a and 25b. The side frames 25a and 25b are able to bend radially outward and inward. Locking tongues 26a and 26b are formed integrally with the side frames 25a and 25b, respectively. The locking tongues 26a and 26b engage with the annular ridge 15 of the tube 14. The locking tongues 26a and 26b are provided in their outer side surfaces with shoulders 23a and 23b, respectively. The annular part 24 of this retainer 16 is a closed ring. A retainer having a U-shaped part corresponding to the annular part 24 is the same in function as the retainer 16 having the annular part 4.

The connector body 12 has side walls respectively provided with openings 27a and 27b. When the retainer 16 is inserted in the connector body 12, the locking tongues 26a and 26b engage in the openings 27a and 27b, respectively, and the shoulders 23a and 23b of the locking tongues 26a and 26b engage separably with the outer edges, on the side of the opening 20, of the openings 27a and 27b. Once the shoulders 23a and 23b engage the outer edges of the openings 27a and 27b, the retainer 16 cannot be removed from the connector body 12 simply by pulling the retainer 16.

Figure 3:
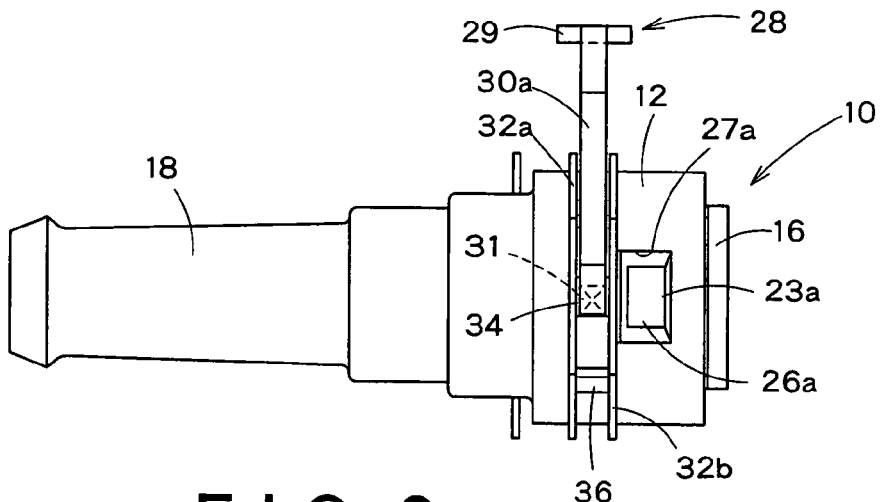
FIG. 3 is a side elevation of the quick connector shown in FIG. 1 with a complete connection indicating member temporarily combined with a connector body.

FIG. 3 shows the temporary assembly of the connector body 12, the retainer 16 and the complete connection indicating member 28 in a side elevation. The complete connection indicating member 28 cannot be further pressed into the connector body 12 from a position shown in FIG. 3 unless the end part of the tube 14 is inserted in the connector body 12 such that the annular ridge 15 of the tube 14 is engaged with the retaining edges of the locking tongues 26a and 26b of the retainer 16.

Figure 4:
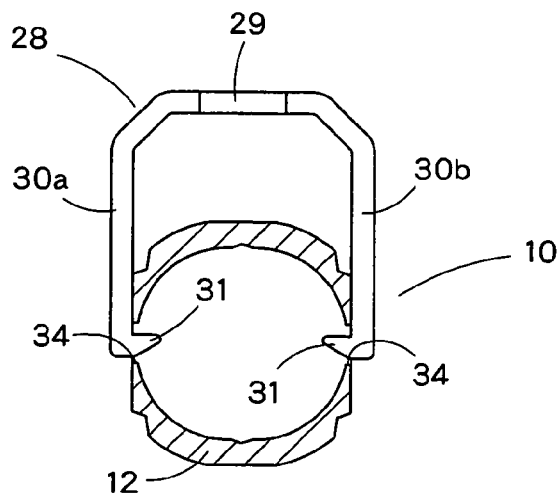
FIG. 4 is a cross-sectional view of the quick connector shown in FIG. 1 with the complete connection indicating member temporarily combined with the connector body.
Figure 8:
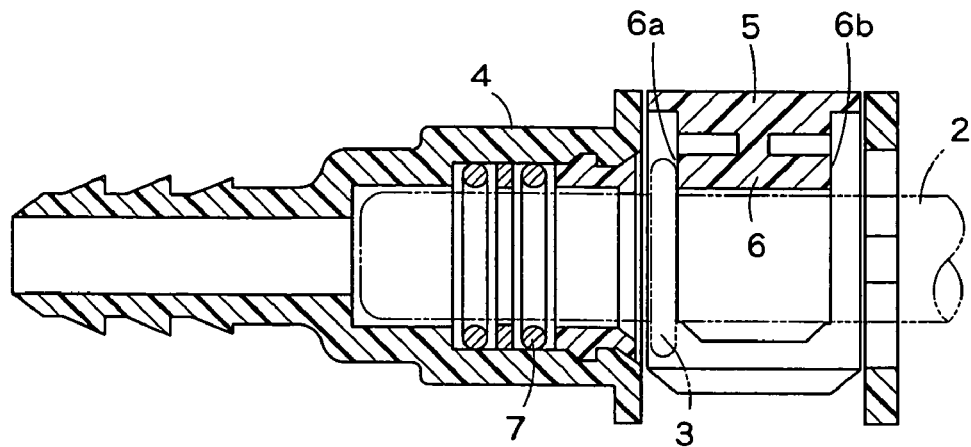
FIG. 8 is a longitudinal sectional view of a conventional quick connector.
Figure 9:
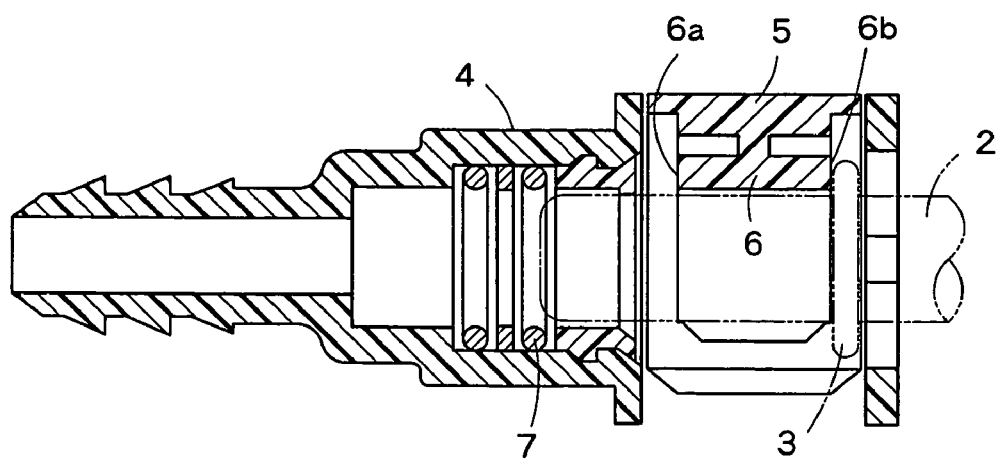
FIG. 9 is a longitudinal sectional view of the conventional quick connector in a state where a tube is incompletely connected to the quick connector.

Referring to FIG. 1, the complete connection indicating member 28 is a U-shaped member formed of a resin. The complete connection indicating member 28 has a rectangular push part 29 and parallel legs 30a and 30b extending downward from the opposite sides of the push part 29, respectively. The legs 30a and 30b are provided at their end parts with hooks 31 projecting toward each other. Circumferential ribs 32a and 32b are formed on the outer surfaces of the side walls of the connector body 12. The distance between the circumferential ribs 32a and 32b corresponds to the width of the legs 30a and 30b. The circumferential ribs 32a and 32b retain the legs 30a and 30b of the complete connection indicating member 28 on the connector body 12, protect the legs 30a and 30b and guide the legs 30a and 30b when the complete connection indicating member 28 is pressed into the connector body 12. Openings 34 are formed in middle parts of parts, between the ribs 32a and 32b, of the side walls of the connector body 12, respectively. The hooks 31 of the legs 30a and 30b of the complete connection indicating member 28 engage in the openings 34, respectively. When the hooks 31 are engaged in the openings 34, the hooks 31 rest on the lower edges of the openings 34 and the tips of the hooks 31 project into the internal space of the connector body 12 as shown in FIG. 4. The complete connection indicating member 28 thus combined with the connector body 12 cannot be pulled out of the connector body 12 because the hooks 31 engage with the upper edges of the openings 34. When the tube 14 is inserted deep enough in the connector body 12, the annular ridge 15 pushes the hooks 31 half out of the openings 34. In a state where the hooks 31 are pushed half out of the openings 34 by the annular ridge 15, the hooks 31 are disengaged from the openings 34 with respect to a direction in which the complete connection indicating member 28 is pressed into the connector body 12 and the hooks 31 remain engaged with the upper edges of the openings 34 so that the complete connection indicating member 28 cannot be pulled out of the connector body 12. The ribs 32a and 32b are formed on the side walls of the connector body 12 so as to correspond to the outline of the complete connection indicating member 28. As shown in FIG. 2, recesses 36 are formed in the side wall of the connector body 12 at a predetermined distance from the openings 34. The hooks 31 engage in the recesses 36 when the complete connection indicating member 28 is pressed into the connector body 12 to a complete connection indicating position.

The use and effects of the quick connector 10 in this embodiment will be described. The quick connector 10 in a temporary assembly formed by temporarily combining the complete connection indicating member 28 with the connector body 12 is delivered to the user. When the quick connector 10 is used, for example, for connecting tubes to form a fuel supply system for supplying fuel to an engine on an automobile assembly line, the incomplete connection of the metal tube 14 to the quick connector can be prevented with reliability. When the tube 14 is inserted deep enough in the connector body 12, the annular ridge 15 of the tube 14 reaches a locking position beyond the edges of the locking tongues 26a and 26b of the retainer 16 as shown in FIG. 5. When the annular ridge 15 is inserted in the connector body 12 to the locking position, the locking tongues 26a and 26b restrains the tube 14 from axial movement so that the tube 14 cannot be pulled out of the connector body 12 and retain the tube 14 in place in the connector body 12.

As the annular ridge 15 of the tube advances to the locking position, the annular ridge 15 engages with the locking tongues 31 of the complete connection indicating member 28 and pushes the hooks 31 radially outward to bend the legs 30a and 30b away from each other. Consequently, the hooks 31 are disengaged from the openings 34 and the complete connection indicating member 28 can be easily pressed into the connector body 12 by pushing the push part 29 with a fingertip to indicate that the complete engagement of the retainer 16 with the annular ridge 15 of the tube 14. When the complete connection indicating member 28 is pushed into the connector body 12, the ribs 32a and 32b guide the legs 30a and 30b of the complete connection indicating member 28. After the complete connection indicating member 28 is fully pushed into the connector body 12, the ribs 32a and 32b conceal and protect the complete connection indicating member 28 as shown in FIG. 6 because the ribs 32a and 32b are formed in a shape corresponding to the outline of the complete connection indicating member 28.

The complete connection indicating member 28 of a push-in type, as compared with a conventional complete connection indicating member of a pull-out type, is suitable for use in a narrow space. Since the complete connection indicating member 28 is kept in the connector body 12, the complete connection indicating member 28 can be repeatedly used for indicating complete connection of the quick connector 10 and a tube.

If the tube 14 is inserted insufficiently deep in the connector body 12 and the annular ridge 15 is not correctly positioned in the connector body 12, the hooks 31 of the complete connection indicating member 28 are not pushed outward to positions where the hooks 31 are able to be disengaged from the openings 34 as shown in FIG. 4. If the complete connection indicating member 28 is pressed in a state shown in FIG. 4, the lower edges of the openings 34 hinder the hooks 31 from moving into the connector body 12 and, consequently, the complete connection indicating member 28 cannot be pressed into the connector body 12. Such a condition of the complete connection indicating member 28 indicates the incomplete engagement of the retainer 16 and the annular ridge 15. Thus the incomplete connection of the quick connector 10 and the tube 14 can be surely prevented.

The hooks 31 of the complete connection indicating member 28 may be provided in its outer surfaces with recesses 35 and the recesses 35 may be engaged with the lower edges of the openings 34 as shown in FIG. 7. When the complete connection indicating member 28 shown in FIG. 7 is pressed with the tube 14 inserted insufficiently deep in the connector body 12 and the retainer 16 and the annular ridge 15 incompletely connected, the engagement of the recesses 35 and the lower edges of the openings 34 make the disengagement of the hooks 31 from the lower edges of the openings 34 more difficult and the complete connection indicating member 28 is able to indicate the incomplete connection with higher reliability.

Weak parts 36 provided with slits and capable of being broken when a force exceeding a threshold level is exerted on the legs 30a and 30b may be formed in the legs 30a and 30b.

Breakage of the weak parts 36 due to the forcible pressing of the complete connection indicating member 28 in a state where the retainer 16 and the annular ridge 15 are incompletely engaged is an evident indication of incomplete connection, and the user is able to notice the incomplete connection of the tube and the quick connector without fail.

The invention claimed is:

1. A quick connector comprising:
a connector body into which an end part, provided with an annular ridge, of a tube can be inserted;
a retainer provided with locking tongues to be engaged with the annular ridge to lock the end part of the tube in place in the connector body; and
a complete connection indicating member for indicating a condition where the end part of the tube has been completely inserted in the connecter body such that the retainer is able to engage completely with the annular ridge;
wherein the complete connection indicating member is insertable in the connector body to a temporary position to combine the complete connection indicating member temporarily with the connector body so that the complete connection indicating member can be only pressed into the connector body in a radical direction, and the complete connection indicating member can be pressed futher toward the connector body from the temporary position to a complete connection indicating position only when the end part of the tube is inserted in the connector body to a position where the locking tongues of the retainer can completely engage with the annular ridge; and
wherein the complete connection indicating member is a U-shaped member having a pair of parallel legs provided at their ends with hooks capable of engaging in openings formed in side walls of the connector body, respectively, and the complete connection indicating member can be pressed further toward the connector body when the end part of the tube is completely inserted in the connector body and the hooks of the complete connection indicating member are pushed by the annular ridge so that the hooks can be disengaged from the openings.

2. The quick connector according to claim 1, wherein the complete connection indicating member has weak parts that break when a force exceeding a threshold is exerted thereon.

3. The quick connector according to claim 1, wherein the hooks of the complete connection indicating member are provided with recesses that engage with lower edges of the openings, respectively.

4. The quick connector according to claim 3, wherein circumferential ribs for guiding the complete connection indicating member are formed on the side surfaces of the connector body in a shape corresponding to the outline of the complete connection indicating member.

5. The quick connector according to claim 1, wherein the retainer is a tubular member having a pair of locking tongues capable of engaging with the annular ridge of the tube and is inserted through a tube receiving opening of the connector body in the connector body.

6. An apparatus comprising the quick connector of claim 1 and first and second tubes; wherein the first tube is inserted into the connector body of the quick connector to connect to the second tube.

7. A quick connector comprising:
- a housing into which an end part, provided with an annular ridge, of a tube can be inserted;
- a retainer provided with locking tongues capable of engaging with the annular ridge of the tube to retain the tube in the housing; and
- a complete connection indicating member for indicating when the insertion of the tube has reached a position which ensures a complete engagement of the locking tongues of the retainer and the annular ridge;
- wherein the complete connection indicating member is placed at a temporary position on the housing so as to be movable only in a radial direction in which the complete connection indicating member is pressed into the housing, and the complete connection indicating member can be pressed from the temporary position further toward the housing when the tube is inserted into the housing at the position which ensures the complete engagement of the locking tongues of the retainer and the annular ridge; and
- wherein the complete connection indicating member is a U-shaped member having a pair of parallel legs with hooked end parts capable of engaging in openings formed in sidewalls of the connector body, the hooked end parts are shaped to be pushed out of the openings by the annular ridge at the position which ensures the complete engagement of the locking tongues and the annular ridge, the hooks are movable in a pressing direction in which the complete connection indicating member is pressed toward the housing and the hooks are immovable in a pulling direction in which the complete connection indicating member is pulled away from the housing.

8. An apparatus comprising the quick connector of claim 7, and first and second tubes; wherein the first tube is inserted into the housing of the quick connector to connect to the second tube.

* * * * *